(12) United States Patent
Wack

(10) Patent No.: US 7,970,994 B2
(45) Date of Patent: Jun. 28, 2011

(54) HIGH PERFORMANCE DISK ARRAY REBUILD

(75) Inventor: Andrew P. Wack, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/042,135

(22) Filed: Mar. 4, 2008

(65) Prior Publication Data

US 2009/0228648 A1    Sep. 10, 2009

(51) Int. Cl.
*G06F 12/00* (2006.01)

(52) U.S. Cl. ........ 711/114; 711/156; 711/158; 711/170; 714/7; 714/25

(58) Field of Classification Search .................. 711/114, 711/156, 158, 170; 714/7, 25
See application file for complete search history.

(56) References Cited

U.S. PATENT DOCUMENTS

| | | | |
|---|---|---|---|
| 5,651,133 A | 7/1997 | Burkes et al. | |
| 6,158,017 A | 12/2000 | Han et al. | |
| 6,728,833 B2 | 4/2004 | Pruett et al. | |
| 6,928,459 B1 * | 8/2005 | Sawdon et al. | 1/1 |
| 6,976,187 B2 | 12/2005 | Arnott et al. | |
| 7,139,931 B2 | 11/2006 | Horn | |
| 7,370,148 B2 * | 5/2008 | Ikeuchi et al. | 711/114 |
| 7,426,655 B2 * | 9/2008 | Shaik et al. | 714/6 |
| 2005/0102552 A1 | 5/2005 | Horn | |
| 2006/0041782 A1 | 2/2006 | Ali et al. | |
| 2006/0123312 A1 | 6/2006 | Forhan et al. | |
| 2007/0067670 A1 | 3/2007 | Ebsen et al. | |

* cited by examiner

*Primary Examiner* — Stephen C Elmore
(74) *Attorney, Agent, or Firm* — Jeffrey N. Giunta; Fleit Gibbons Gutman Bongini & Bianco PL

(57) ABSTRACT

A method, information processing system, and computer program storage product for managing disk failures in a disk array. At least one disk in a first disk array is determined to have failed. The first disk array only accesses data by reading an entire stripe that is distributed across multiple disks in the first disk array. A number of spare disks are selected that is equal to a number of disks making up the first disk. A second disk array is created from the number of disks that has been selected. Data is acquired from the first disk array by reading at least one entire stripe from the first disk array. A corresponding stripe comprising the data from each respective stripe that has been acquired is written to the second disk array.

20 Claims, 9 Drawing Sheets

```
Begin
  New_Q <- empty;
  Old_Q <- empty;
  New_stripe_repaired[1..n] <- FALSE;      }-548
  New_stripe_dirty[1..n] <- FALSE;
  all_repaired <- FALSE;
  while not all_repaired do {
    if pending user I/O request x then {
      if write request {
        y = find_next_stripe_to_repair (New_stripe_repaired, New_Q);
        in parallel do {
          write stripe x to New
          read stripe y from Old
        }
        New_stripe_repaired[x] <- TRUE;                                      >-550
        New_stripe_dirty[x] <- TRUE;
        remove x from New_Q if present;
        push y on New_Q;
        replace or add x on Old_Q;
      } else {
        if New_stripe_dirty[x] then {
          y = pop Old_Q;
          in parallel do {
            read stripe x from New;                                          >-552
            write y to Old
          }
          New_stripe_dirty[y] = FALSE;
        }
      } else {
        if New_Q is not empty then {
          y = pop New_Q                                                      >-554
          in parallel do {
            read x from Old;
```

FIG. 5A

```
            write y to New;
          }
        New_stripe_repaired[y] <- TRUE;
        if not New_stripe_repaired[x] then
          push x on New_Q;
      } else {
        if New_stripe_repaired[x] then {                          ⎫
          y = find_next_stripe_to_repair (New_stripe_repaired,    ⎬ 554
New_Q);                                                           ⎭ in parallel do {
            read stripe x from New
            read stripe y from Old
          } push y on New_Q;                                        ⎫
        } else {                                                  ⎪
              read x from Old;                                    ⎬
              push x on New_Q;                                    ⎪
          }                                                       ⎪
        }                                                         ⎬ 556
      }                                                           ⎪
    }                                                             ⎪
  } else {                                                        ⎪
    y = find_next_stripe_to_repair (New_stripe_repaired, New_Q);  ⎪
    if New_Q is not empty then {
      x = pop New_Q
      in parallel do {
        read stripe y from Old
        write stripe x to New
      }
      push y on New_Q
      New_stripe_repaired[y] <- TRUE;                             ⎫
    } else {                                                      ⎬ 558
      read stripe y from Old;
      push y on New_Q;
    }
  }
 }
}
END
```

FIG. 5B ly performed automatically by the RAID controller using a "hot spares" disk already attached to the controller. The replacement disk is used to rebuild the failed disk, thereby recreating the data at the failed disk. However, current rebuilding mechanisms are problematic because during a RAID rebuild the performance of the RAID array is degraded, especially as utilization of the RAID array increases, and the impact becomes greater and greater.
HIGH PERFORMANCE DISK ARRAY REBUILD

FIELD OF THE INVENTION

The present invention generally relates to the field of data storage disk array systems, and more particularly relates managing disk failures in a disk array system.

BACKGROUND OF THE INVENTION

Current RAID disk solutions allow for disk loss without the loss of data. For example, after a loss of a disk (e.g., disk failure), a replacement disk is added to the array. This is generally performed automatically by the RAID controller using a "hot spares" disk already attached to the controller. The replacement disk is used to rebuild the failed disk, thereby recreating the data at the failed disk. However, current rebuilding mechanisms are problematic because during a RAID rebuild the performance of the RAID array is degraded, especially as utilization of the RAID array increases, and the impact becomes greater and greater.

This performance degradation is very noticeable in file systems such as General Parallel File System ("GPFS") where entire array stripes across all disks are accessed as compared to individual data blocks. In these types of file systems it is possible to keep the array 100% utilized for long periods of time. Thus any rebuilding of the array greatly impacts the performance of the file system because the system's stripping methods results in the system running only as fast as the slowest array. As storage subsystems continue to increase to multi peta-byte levels, the likelihood that at any given time an array is in a degraded state starts to approach 100%.

Therefore a need exists to overcome the problems with the prior art as discussed above.

SUMMARY OF THE INVENTION

In one embodiment, a method for managing disk failures in a disk array is disclosed. The method includes determining that at least one disk in a first disk array has failed. The first disk array only accesses data by reading an entire stripe that is distributed across multiple disks in the first disk array. A number of spare disks is selected that is equal to a number of disks making up the first disk array. A second disk array is created from the number of disks that has been selected. Data is acquired from the first disk array by reading at least one entire stripe from the first disk array. A corresponding stripe comprising the data from each respective stripe that has been acquired is written to the second disk array.

In another embodiment, an information processing system for managing disk failures in a disk array is disclosed. The information processing system includes a memory and a processor that is communicatively coupled to the memory. The information processing system also includes a disk array controller that is communicatively coupled to at least a first storage disk array and a set of spare storage disks. The disk array controller includes a disk rebuild manager adapted to determine that at least one disk has failed in the first disk array. The first disk array only accesses data by reading an entire stripe that is distributed across multiple disks in the first disk array. A number of spare disks in the set of spare disks is selected that is equal to a number of disks making up the first disk array. A second disk array is created from the number of disks that has been selected. Data from the first disk array is acquired by reading at least one entire stripe from the first disk array. A corresponding stripe comprising the data from each respective stripe that has been acquired is written to the second disk array.

In yet another embodiment a computer program storage product for managing disk failures in a disk array is disclosed. The computer program storage product includes instructions for determining that at least one disk in a first disk array is has failed. The first disk array only accesses data by reading an entire stripe that is distributed across multiple disks in the first disk array. A number of spare disks is selected that is equal to a number of disks making up the first disk array. A second disk array is created from the number of disks that has been selected. Data is acquired from the first disk array by reading at least one entire stripe from the first disk array. A corresponding stripe comprising the data from each respective stripe that has been acquired is written to the second disk array.

One advantage of the various embodiments of the present invention is that file systems such as GPFS systems do not experience performance degradation during a disk rebuild. Hot spares in a controller are pooled together for rebuilding an entire array as compared to rebuilding a single disk as is performed in conventional systems. The various embodiments of the present invention allow for this rebuilding process to be performed with a majority of the ongoing I/O requests running at full speed. After an array has been completely rebuilt, duplicate disks (e.g. the ones that are copies of the non-failed disks), can be released back into the hot spare pool to assist with future rebuilds.

The total time to rebuild an array in one embodiment of the present invention is generally no longer than the time for a conventional RAID system to rebuild a single disk. In many instances the rebuilding mechanism provided by one embodiment of the present invention is faster than rebuilding a single disk, as the rebuild time has a constant upper bound in time; regardless of incoming user I/O load. An additional advantage is that if the RAID array is configured to handle multiple disk failures, and additional failures occur (on the original array) during the rebuild process, an increase in rebuild time for handling the additional failures is generally not experienced.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIGS. 5A and 5B illustrate pseudo code for rebuilding a failed disk in a disk array according to an embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Computing Environment

Figure 1:
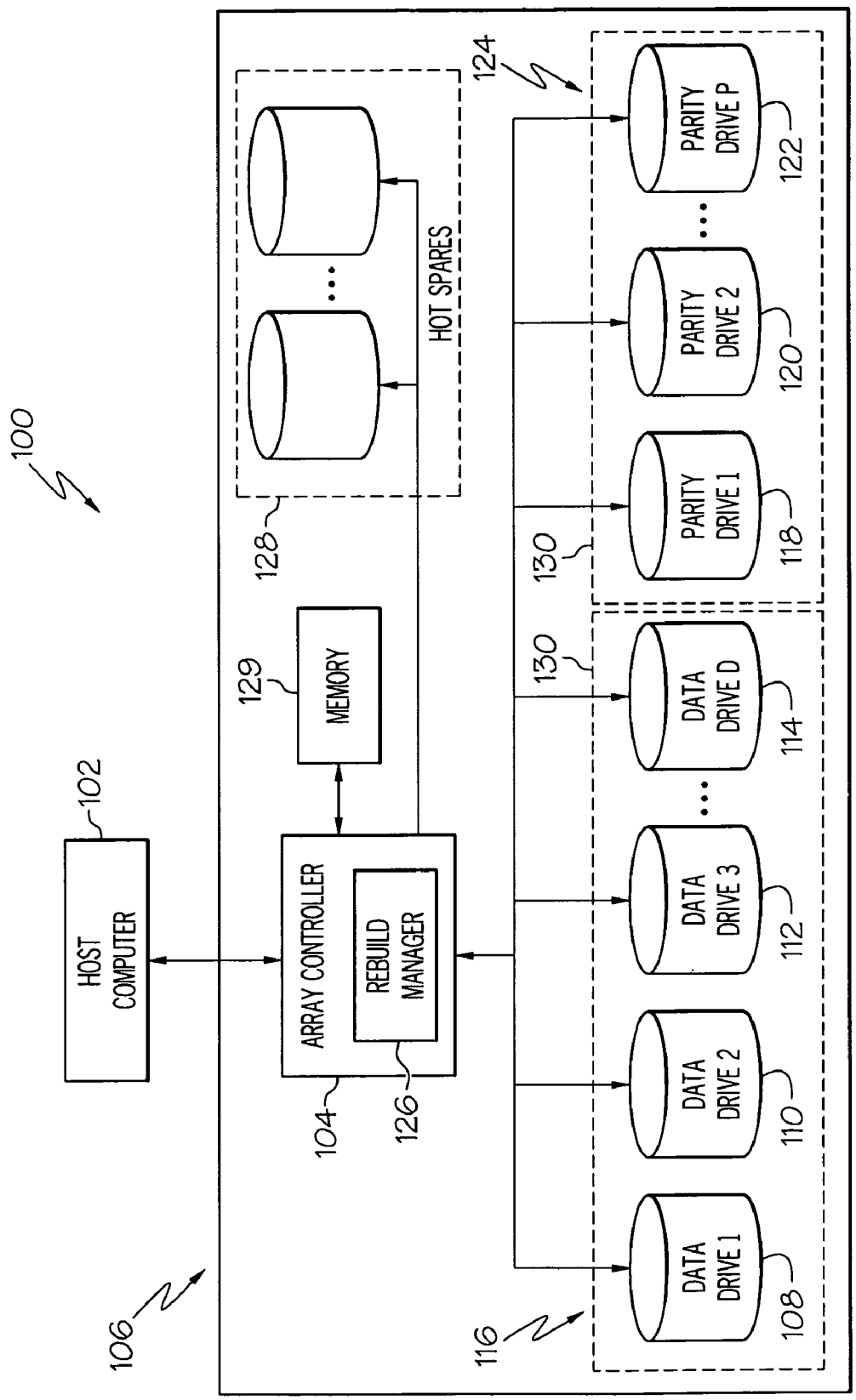
FIG. 1 is a block diagram illustrating one example of a computing environment, according to an embodiment of the present invention.

FIG. 1 is a block diagram illustrating one example of an environment (a disk drive system 100) in which various embodiments of the present invention can be used. In particular, FIG. 1 shows a host computer 102 is communicatively coupled to an array controller 104 of system 106. The host computer 102 stores and receives data from the system 106. The array controller 102 stores the host data, for example, on D data drives, such as: a data drive 1, 108, a data drive 2, 110, a data drive 3, 112, through a data drive D, 114 (referenced collectively as data drives 116). The array controller 104 stores parity in, for example, P parity drives, such as: a parity drive 1, 118, a parity drive 2, 120, through a parity drive P, 122 (referenced collectively as parity drives 124). The collection of disks 116, 124 is referred to as an array 130. It should be noted that although only one array is shown in FIG. 1 the environment 100 can comprise multiple arrays. The array controller 104, in one embodiment, is communicatively coupled to memory 129 used to maintain functions such as (but not limited to) a data read/write cache. The memory 129 can reside within the array controller 104 and/or outside of the array controller 129.

The array controller 104, in one embodiment, comprises a rebuild manager 126 for managing rebuild of disk arrays. The rebuild manager 126, in one embodiment, is configured to rebuild an entire array of disks comprising a failed disk as compared to rebuilding the single failed disk. The rebuild manager 126 utilizes a plurality of hot spares 128 (a collection of disks communicatively coupled to the array controller 104 for use in rebuild operations) to perform its rebuild operations. This rebuild process in one embodiment of the present invention can be performed with a majority of the ongoing I/O requests running at full speed. Therefore, file systems such as a GPFS system that accesses entire array stripes do not experience any performance degradation. This rebuild process is discussed in greater detail below.

The array(s) 130 in the system 100 of FIG. 1 provides a data redundancy scheme such as Redundant Arrays of Independent Disk ("RAID") system where data files and related parity are striped across the multiple disk drives 116, 124. In storage subsystems that manage multiple hard disk drives (herein referenced interchangeably as disks or drives) as a single logical direct attached or network attached storage device (DASD/NASD), the RAID logic is implemented in the array controller 104 of the subsystem. Such RAID logic may also be implemented in a host system 102 in software.

Disk arrays, in particular RAID-3 and RAID-5 disk arrays, represent accepted designs for highly available and reliable disk subsystems. In such arrays, the exclusive-OR of data from some number of disks is maintained on a redundant disk (the parity drive 124). When a disk fails, the data on it can be reconstructed by exclusive-ORing the data on the surviving disks and writing this data into a spare disk. Data is lost if a second disk fails before the reconstruction is complete. The most common RAID systems are based on parity schemes to provide added fault tolerance.

To update a small portion of data in a RAID-5 system, the RAID array controller first reads the old data in that location, reads the corresponding old parity from the corresponding parity drive, and XORs (exclusive ORs) these data with the new data to generate the new parity, after which the RAID array controller can write the new data to the data drive and the new parity to the parity drive. In other terms, the RAID array controller needs to perform a read-modify-write of the data drive and the parity drive. Each read of the data drive or the parity drive requires movement of a disk arm to the data being read; this movement is referenced as a "seek". In systems with two or more parity drives, for example a RAID-6 system, one seek is required for each parity drive to read parity data during the write process.

Figure 2:
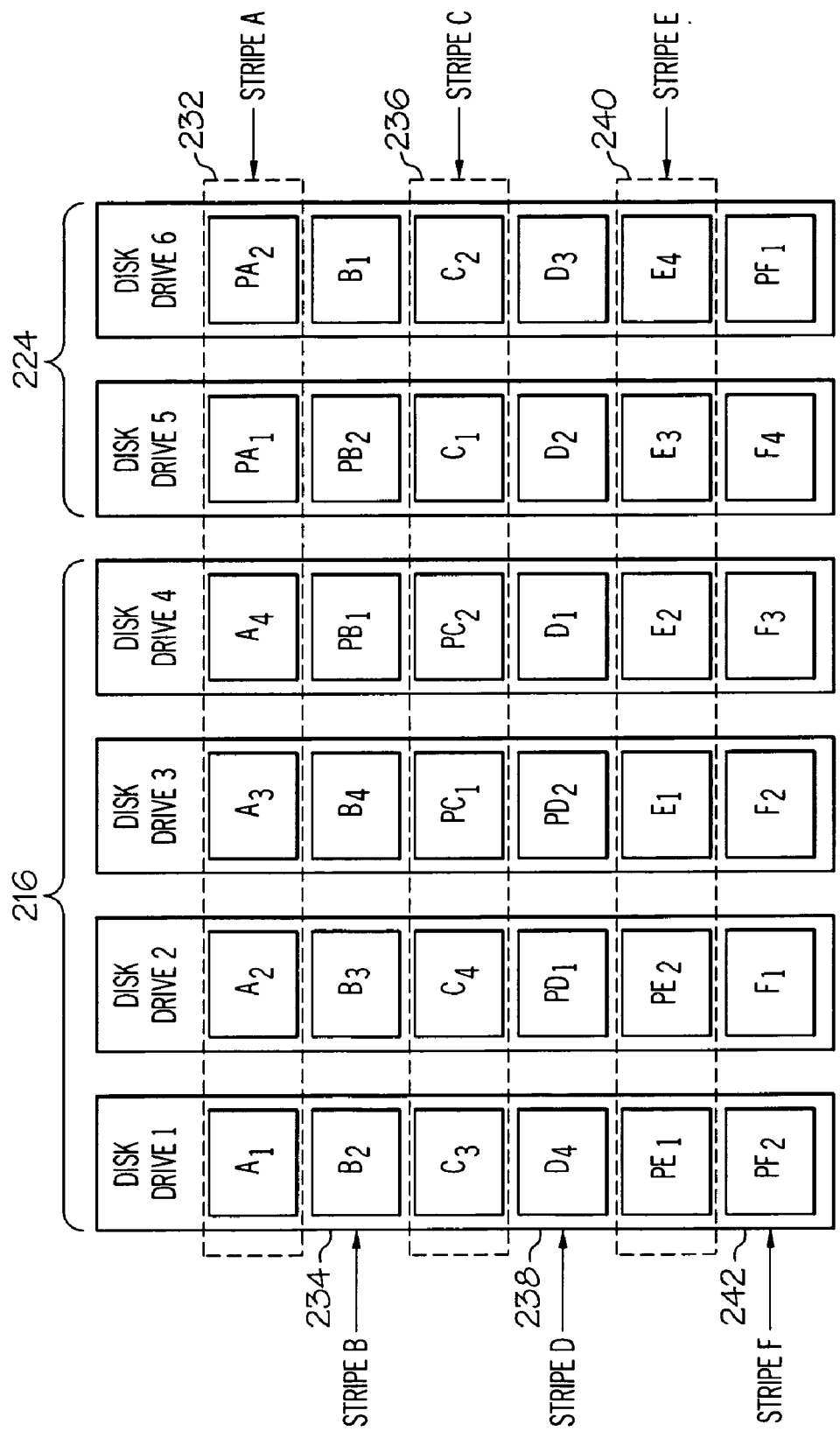
FIG. 2 is a block diagram illustrating one example of RAID disk array stripping arrangement according to an embodiment of the present invention.

As noted above, the rebuilding mechanism of the array controller 104 is very beneficial to various file system types such as GPFS systems. This is because in these files systems, data is accessed across a stripe and not a single disk. FIG. 2 shows one example of array stripes. In particular FIG. 2 shows a conventional RAID data layout in which four disks 216 in each stripe 232-242 are designated as data drives and two disks in each stripe 232-242 are parity drives 224. For example, drives 1 through 4 are the data drives for stripe A and drives 5 and 6 are the parity drives for stripe A; drives 1 through 3 and drive 6 are the data drives for stripe B and drives 4 and 5 are the parity drives for stripe B. Letters Ax, Bx, Cx, Dx, Ex, and Fx are used to designate data blocks of different stripes and letter Px designates a parity block for the data blocks of its stripe. The data and parity drives for each stripe are rotated (or permuted) to the left with respect to the data and parity drives of the preceding stripe. The array controller 104 manages the data drives 216 and the parity drives 224 and thus knows the boundaries of the array data blocks and the boundaries of the parity blocks.

When a disk in an array fails, conventional rebuilding mechanisms rebuild only the single disk that has failed. This greatly diminishes the performance of systems that use, for example, GPFS file systems since those systems access entire stripes of data. However, the rebuild manager 126 in the array controller 104 of the various embodiments of the present invention rebuilds the entire array of disks as will now be discussed in greater detail with references to FIGS. 3-5.

Figure 3:
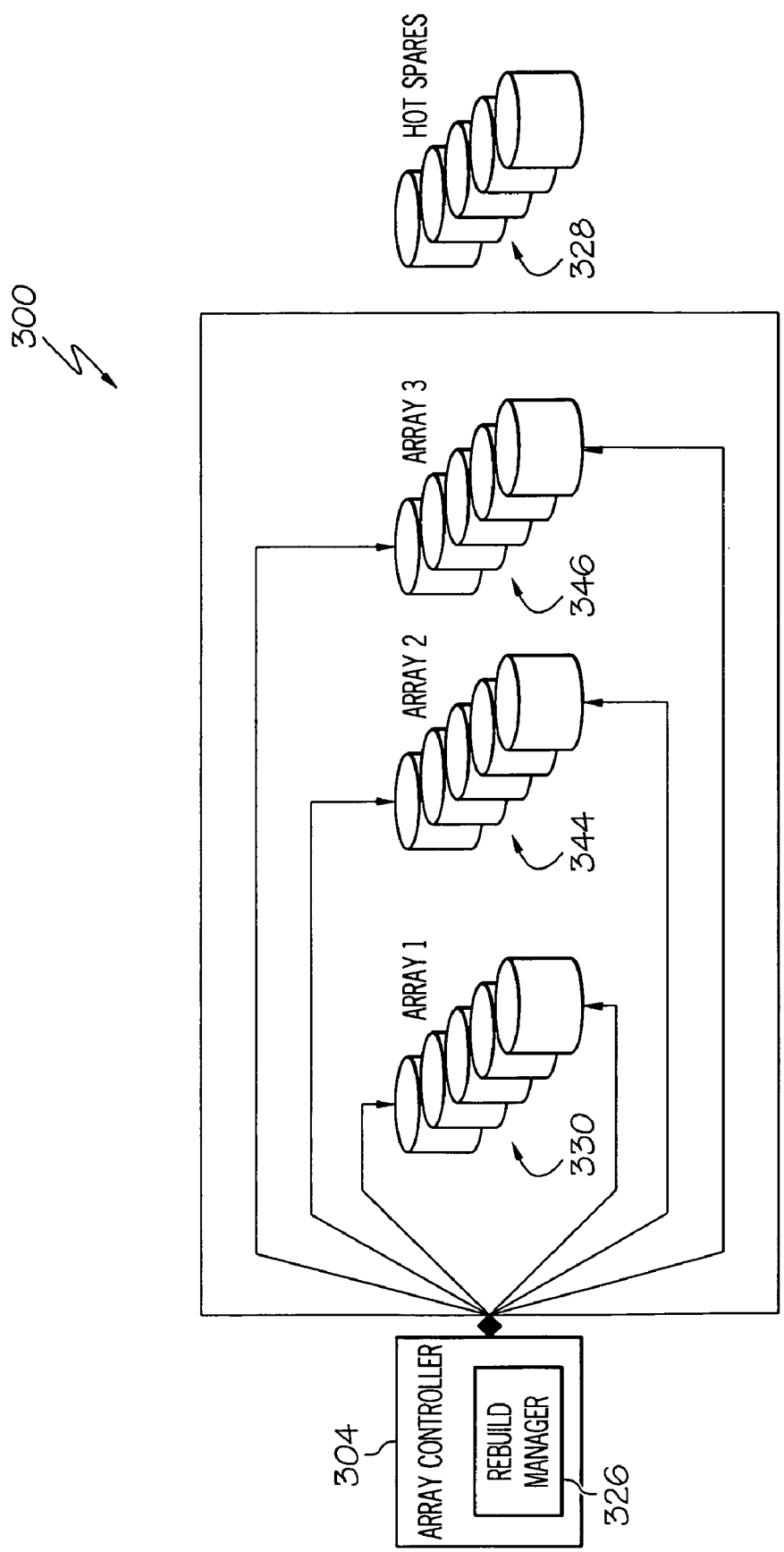
FIG. 3 is a block diagram illustrating one example a RAID disk environment according to an embodiment of the present invention.

FIG. 3 is a block diagram illustrating an environment 300 similar to the environment 100 of FIG. 1. The environment 300 of FIG. 300 comprises a plurality of disk arrays 330, 344, 346 and hot spares 328. Each of these arrays 330, 344, 346 are controlled and managed by the array controller 304, which comprises the rebuild manager 326. When one or more disks in an array fails, the rebuild manager 326 rebuilds the entire array comprising the failed disks using the hot spares 328.

Figure 4:
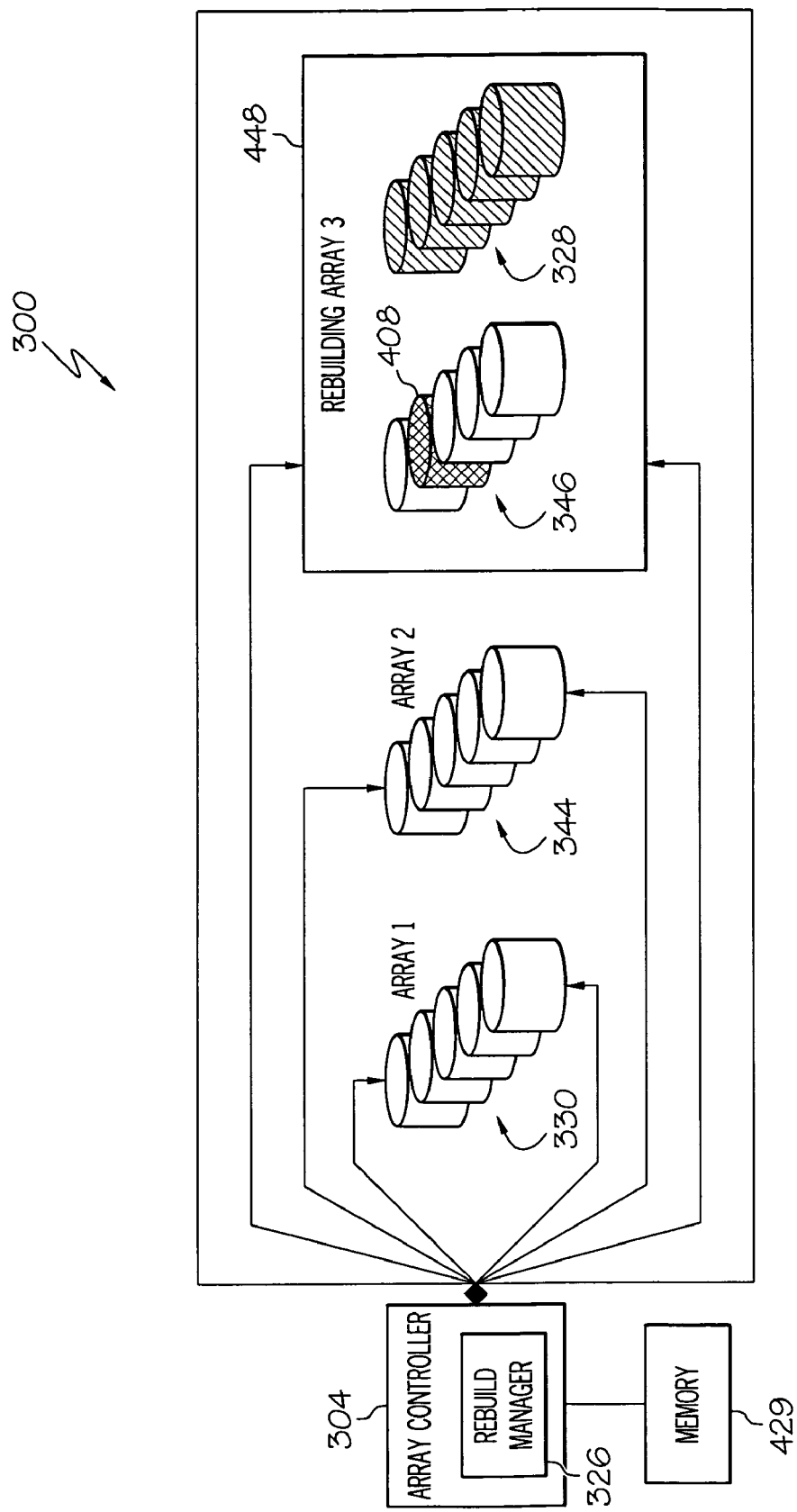
FIG. 4 is a block diagram illustrating one example a system for rebuilding a failed disk in a disk array according to an embodiment of the present invention.

For example, FIG. 4 shows the environment 300 of FIG. 3 where a single disk 408 has failed in a rebuilding disk array_3 346. As discussed above, conventional data rebuilding systems only rebuild the single failed disk 408. However, the rebuild manager 326, in one embodiment of the present invention, rebuilds the entire rebuilding disk array_3 346 that includes the single failed disk 408. The rebuild manager 326 determines the number of disks in the array_3 346 comprising the failed disk 408 and selects an equivalent number of disks from the hot spare pool 328. The Array_3 346 described above is now referred to as Rebuilding Array_3 448 because it comprises both the old array_3 346 disks and the hot spare disks 328 that are being used to rebuild the previously intact array_3 346. In a conventional RAID, only a single disk would be moved into the rebuilding array_3 448 to participate in the rebuild and replace the failed disk 408. It should be noted that the hot spare set 328 that has been brought in by the rebuild manager 326 to perform the rebuild is from hereon in referred to as the "new array 328" and the array_3 346 comprising the failed disk 408 is referred to as the "old array 346".

In one embodiment, the rebuild manager 326 rebuilds the old array 346 onto the new array 328 in the background. For example, if a read request is received by the array controller 304, the rebuild manager 326 causes the data to be retrieved by the read request to be read from the old array 346. The data which has been read is then returned to the user and then written to the new array 328. This leaves old array 346 ready to process the next request.

If the array controller 304 receives a write request, the rebuild manager 326 sends the write request directly to the new array 328. The rebuild manager 326 also performs, in parallel, a simultaneous read from the old array 346 for other data that still needs to be repaired and written to the new array 328. This allows data to be accumulated in the background from the old array 346 and stored, such as in a data cache in memory 429, in preparation for writing to the new array 328 when the new array 328 is not busy, even if the user never requests that other specific data. This accumulated data is able to be written to the new array 328 at a time when, for example, a different request is being processed by the old array 346.

With respect to read operations, if work (such as a write operation) is not to be performed on the new array 328, the rebuild manager 326 responds to read requests by first trying to read the requested data from the data stored on the new array 328 (if it is valid) so that other data can be acquired from the old array 346 to be later written to the new array 328. For example, the new array 328 generally comprises the most up-to-date information since the new array 328 is replacing the old array 346. Therefore, when a read request is received at the array controller 304, the rebuild manager 326 first checks the new array 328 for the data if work is currently not being performed at the new array 328.

During this read operation on the new array 328, the rebuild manager 326 concurrently acquires other data from the old array 346 and stores it in memory (e.g., cache) 429 so that this other data can be written to the new disk array 328 at an opportune time. After the new array 328 has been completely rebuilt, duplicate disks (e.g. the disks within the old array 346 except for the failed disk 408), can be released back into the hot spare pool to assist with future rebuilds. It should be noted that the rebuild manager 326 of one embodiment operates to reduce the probability that a series of read or write requests will cause the recovery process to starve. It should also be noted that any additional recoverable failures that occur in the old array 346 during a rebuild process do not cause the rebuild manager 326 to alter its rebuild process, the recover process simply continues and finishes in the same amount of time since the entire contents of all of the disks in the old array 346 are being copied to the new array 328.

By rebuilding the new array 328 in the background (e.g., performing writes to the new array 328 when a read operation is being performed on the old array 346), file systems, such as GPFS systems, that access an entire array stripe when access data do not experience performance degradation during the disk rebuild. The majority of the ongoing I/O requests in one embodiment of the present invention are able to run at full speed ensuring that system performance is not impaired.

FIGS. 5A and 5B display pseudo code 500 for a more detailed process of performing the rebuilding process of the rebuild manager 326 discussed above. The following discussion is a more detailed explanation of the pseudo code 500 and the rebuilding process of the rebuild manager 326 discussed above. As noted above, RAID arrays employ the concept of a "stripe group", which us the same number of blocks on all drives that are read together and include the combined data and parity information for the "stripe group block". Throughout pseudo code 500 of FIGS. 5A and 5B, I/O requests are referred in terms of a request for stripe groups under the assumption that the array controller 104 handles all I/O requests by reading an entire stripe group. This reading either retrieves data from the physical storage devices or from the cache 129 if the stripe group has already been retrieved and is in the controller cache 129. The processing performed by the pseudo code 500 is performed by the rebuild manager 326 while there are data I/O requests pending for the RAID array being rebuilt.

The first set of statements 548 illustrates the process of the rebuild manager 126 initializing its queues and flag arrays. For example, the rebuild manager 126 comprises a new_array_queue, and an old_array_queue queue as well as, a new_array_stripe_repaired flag array, and a new_array_stripe_"dirty" flag arrays. The new_array_queue is used by the rebuild manager 126 to store an indication of data stripes that need to be written to the new array 328. The old_array_queue is used by the rebuild manager 126 to store a list of data stripes that are to be written back to the old array 346 to reduce the number of dirty stripes on the new array 328. The new_array_stripe_repaired flag array contains a flag for each stripe that indicates that the respective stripe in a new array 328 has been rebuilt. The new_array_stripe_dirty flag array contains a flag for each stripe to indicate if the data in that strip of the new array 328 is dirty and no longer matches the data in the old array 346 (e.g. data in the old array 346 is stale).

The next set of statements represent a write processing 550 that is performed by the rebuild manager 126 when there are pending I/O requests to write data to the RAID array being rebuilt. When the rebuild manager 126 receives a write request, the rebuild manager 126 directs the write request to the new array 328. While the data is being written to the new array 328, the rebuild manager 126 identifies the next stripe, Stripe Y in this example, that needs to be repaired and performs a read of the stripe from the old array 346 to queue it up for being written at the new array 328.

The next stripe that needs to be repaired can be determined in a variety of ways. For example, as is illustrated by pseudo code 500, the new_array_stripe_repaired flag array is examined to determine a stripe that has not yet been repaired. The rebuild manager 126 then reads data from the next strip in the sequence while data is being written to the current stripe. Once the data is written to Stripe X, in this example, the flag corresponding to that stripe is marked as repaired, or TRUE, in the new_array_stripe_repaired flag array.

The rebuild manager 126 also determines if the new array queue has stale data for Stripe X. For example, data for Stripe X may have been queued to be written to Stripe X. This data was placed in the queue from a previous read operation of the corresponding Stripe X on the old array 346. However, because a user requested a write operation, the rebuild manager 126 sent the write operation directly to the new array 328. Therefore, the most up-to-date information for Stripe X has already been written in the new array 328 and the data in the new array queue waiting to be written to Stripe X is stale. The rebuild manager 126 subsequently removes this data from the queue.

It should be noted that the rebuild manager 126 reads data from stripes on the old array 346 any chance it has when it determines that system performance will not be impaired from the read operation. It should be noted that the rebuild manager 126 also uses an old array queue as discussed above. This is a queue used by the rebuild manager 126 to write data back to the old array 346 to improve the performance of the rebuild operation. This is done so that future read requests are more likely to be satisfied by the old array 346, which keeps the new array 328 free to perform rebuild operations. Without this optimization, the rebuild operation could starve by a very simple sequence of operations: write to stripe x, and then read stripe x repeatedly. Without writing data back to the old array 346, the new array 328 would be constantly satisfying read requests for stripe x in this example.

The next set of statements 552-556 illustrates the processes taken by the rebuild manager 126 when it receives a read request. In the new array stripe dirty statement set 552, the rebuild manager 126 first determines if the data stripe to be read within the new array 328 comprises the only valid copy of the requested data. It should be noted that the data in the new array stripe may be "dirty," which indicates that new data has been written to the data stripe and the data on the old array 346 is no longer valid. In this situation, because the data for that stripe in the new array 328 is the only location with valid data, the data is read from the new array 328. The rebuild manager 126 takes any opportunity, such as any time there is a spare background cycle on the old array 346, to write pending data in the old_data_queue to the old array 346 to reduce the "dirty" data. Therefore, since the read is being performed on the new array 328, the rebuild manager 126 also checks the old array queue to see if any data needs to be written to the old array 346. If so, the rebuild manager 126 writes the data in the queue to the old array 346.

In new array stripe not dirty statement set 554, the rebuild manager 126 determines if it is more efficient to read the requested data from the old array 346 or from the new array 328. In this situation the rebuild manager 126 checks the old array queue and the new array queue to determine which queue has pending work. In this example, the new array queue is given priority over the old array queue. Therefore, the rebuild manager 126 determines if data acquired from the old array 346 from a prior operation is waiting to be written to the new array 328. If so, the rebuild manager 126 writes that data to the new array 328 while performing the requested read on the old array 346 to maximize disk I/O between the two arrays.

If the rebuild manager 126 determines that a pending write job does not exist on the new array queue, the rebuild manager 126 identifies the next stripe on the new array 328 to be repaired (if any). The rebuild manager 126 performs the read request on the new array 328 in response to the request received from the user while at the same time acquiring data from the old array 346 so as to also use the I/O capacity of the old array 346 to support more rapid repair of the identified stripe.

Statement set 556 shows that if the rebuild manager 126 determines that the new array 346 does not have any pending jobs and the new array does not have a valid copy of data being requested from the user, the rebuild manager 126 acquires that requested data from the old array 346 and queues that data to be written to the new array 328.

In the final statement set 558, the rebuild manager 126 determines that there are no pending external I/O requests. Therefore, the rebuild manager 126 determines if there is work to be done on the new array 328 (i.e., new array queue has a pending job). If there is, the rebuild manager 126 then takes the next stripe to be written to the new array 328 off of the new array queue, while simultaneously reading the next stripe that needs to be repaired from the old array 346 and places it onto the new array queue to be written later. In the situation where there is no pending stripes to be written to the new array 328, then the rebuild manager 126 just reads the next stripe that needs to be repaired from the old array 346 and places it onto the new array queue to be written later. The processes in the statement sets 550-556 continue until the rebuild manager 126 determines that all stripes have been repaired. Once the rebuild is finished, the rebuild manager 126 replaces the old array 346 with the new disks 326 and returns all the working disks to the hot spare pool. Alternately, the rebuild manager 126 can swap in only the repaired disks for those that failed and return the balance of the new array disks to the pool.

It should be noted that at first it might appear that a series of writes all to the same stripe group would cause the rebuild process above to starve the recovery process. However, since RAID controllers typically cache reads/writes, in that situation, the "no pending I/O request" exists, as the writes are being stored in cache 129. Also note that in a RAID environment, to process a write, a read of the entire stripe group must generally be performed in order to generate parity data. So the situation of a stream of writes to successive stripe groups also does not cause the rebuild process above to starve or overload. This is because there are always read requests that are to be performed in the background on the arrays.

Example of an Information Processing System

Figure 6:
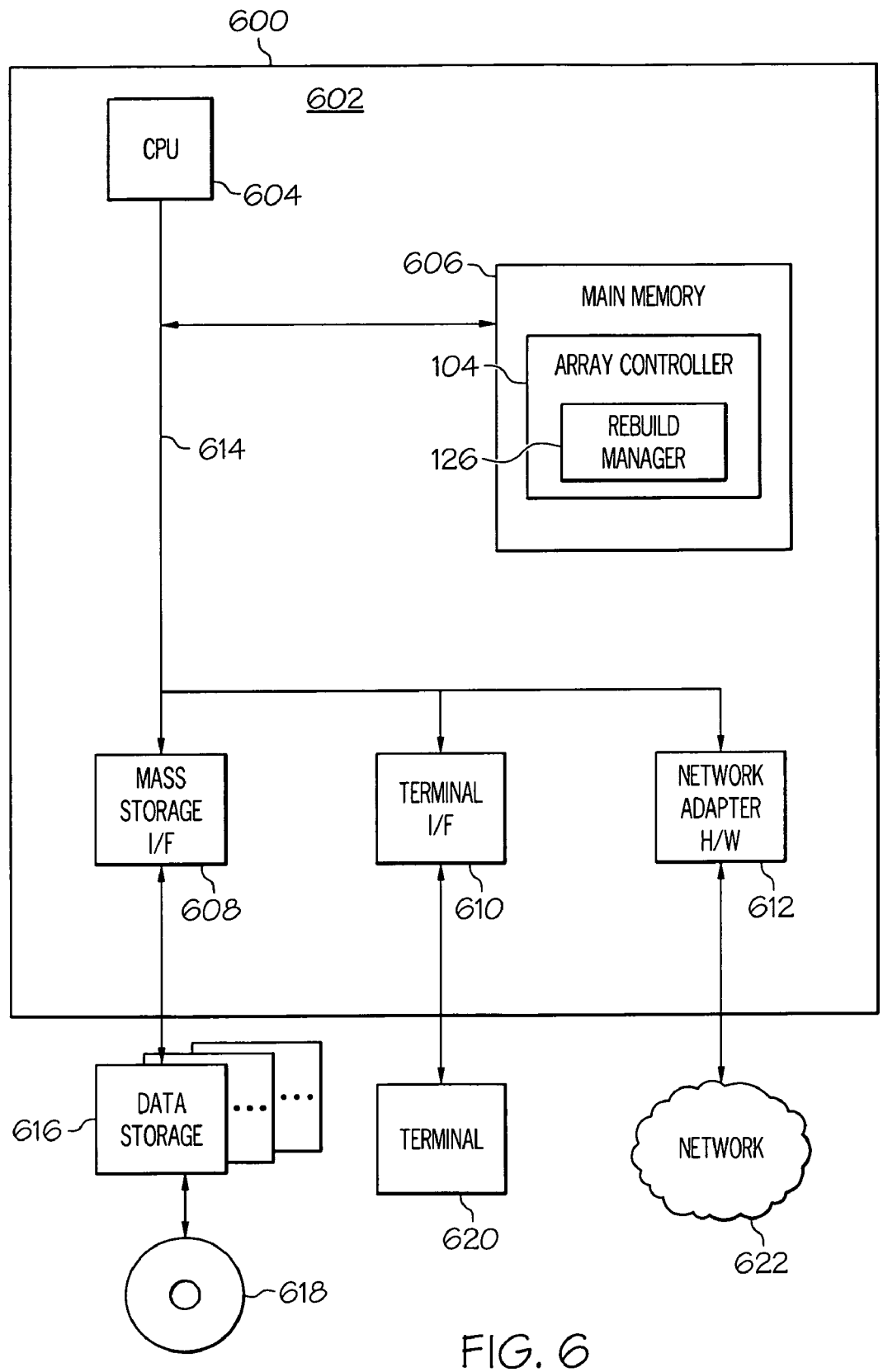
FIG. 6 is a block diagram illustrating a detailed view of an information processing system according to an embodiment of the present invention.

FIG. 6 is a block diagram illustrating a detailed view of an information processing system 600 according to an embodiment of the present invention. The information processing system 600 comprises the array controller 104 discussed above. The information processing system 600 includes a computer 602. The computer 602 has a processor 604 that is connected to a main memory 606, mass storage interface 608, terminal interface 610, and network adapter hardware 612. A system bus 614 interconnects these system components. The mass storage interface 608 is used to connect mass storage devices, such as data storage device 616, to the information processing system 102. One specific type of data storage device is a computer readable medium, such as an optical disk, which may be used to store data on a CD 618 or DVD (not shown). Another type of data storage device is a data storage device configured to support, for example, ext2 type file system operations.

The main memory 606, in one embodiment, includes the array controller 104 and the rebuild manager 126 discussed above in greater detail. Although illustrated as concurrently resident in the main memory 606, it is clear that respective components of the main memory 606 are not required to be completely resident in the main memory 606 at all times or even at the same time. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 600.

Although only one CPU 604 is illustrated for computer 602, computer systems with multiple CPUs can be used equally effectively. Various embodiments of the present invention further incorporate interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the information processing system 600. The terminal 620 is also able to consist of user interface and peripheral devices that are connected to computer 602 and controlled by terminal interface hardware included in the terminal I/F 610 that includes video adapters and interfaces for keyboards, pointing devices, and other devices/interfaces.

An operating system (not shown) included in the main memory is a suitable multitasking operating system such as (but not limited to) the Linux, UNIX, Windows XP, and Windows Server operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 600. The network adapter hardware 612 is used to provide an interface to a network 622. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a program product via CD or DVD, e.g. CD 618, CD ROM, or other form of recordable media, or via any type of electronic transmission mechanism.

Operation Flow for Rebuilding a Failed Disk in a Disk Array

Figure 7:
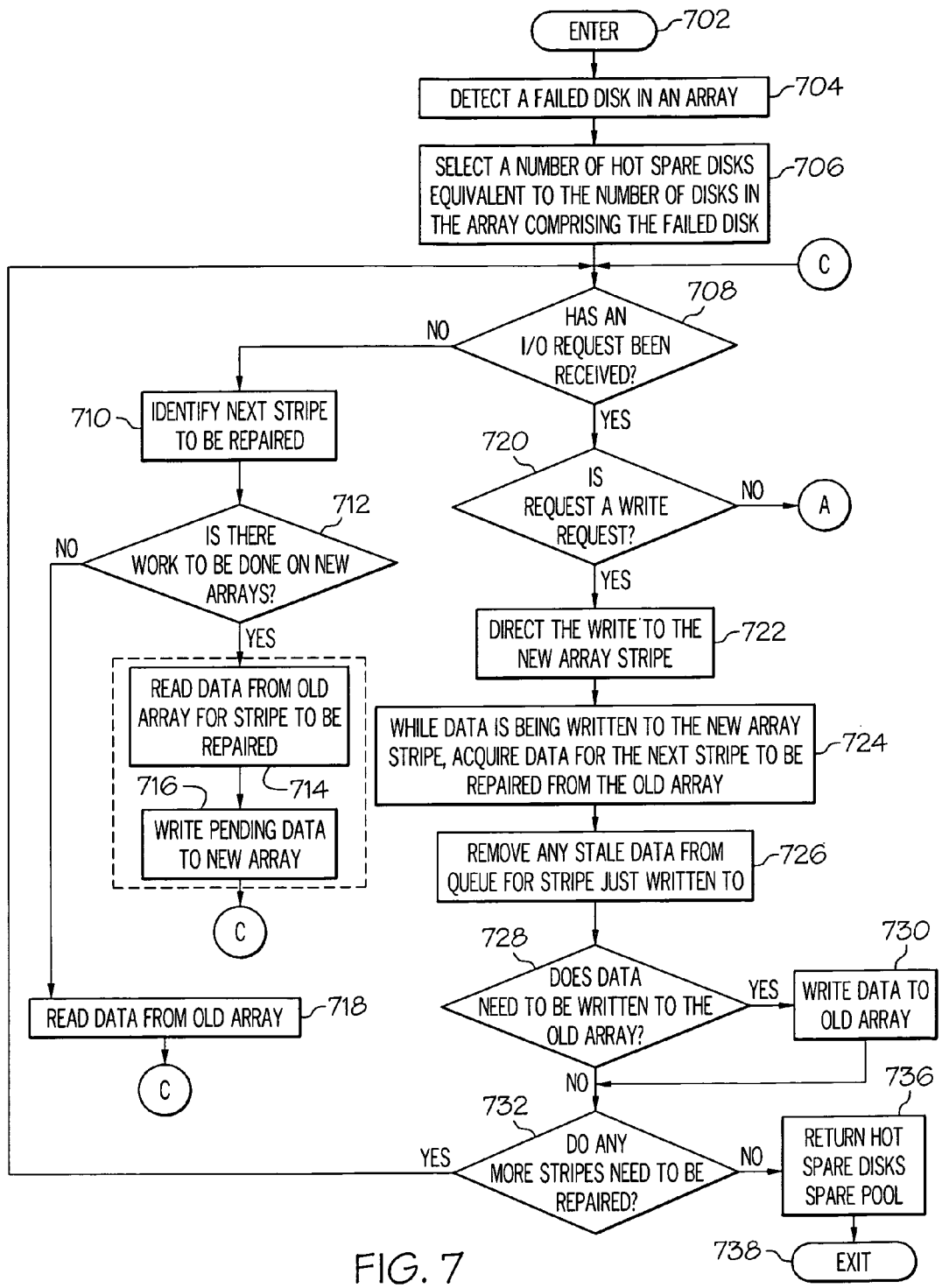
FIGS. 7-8 are operational flow diagrams illustrating a process for rebuilding a failed disk in a disk array according to an embodiment of the present invention.
Figure 8:
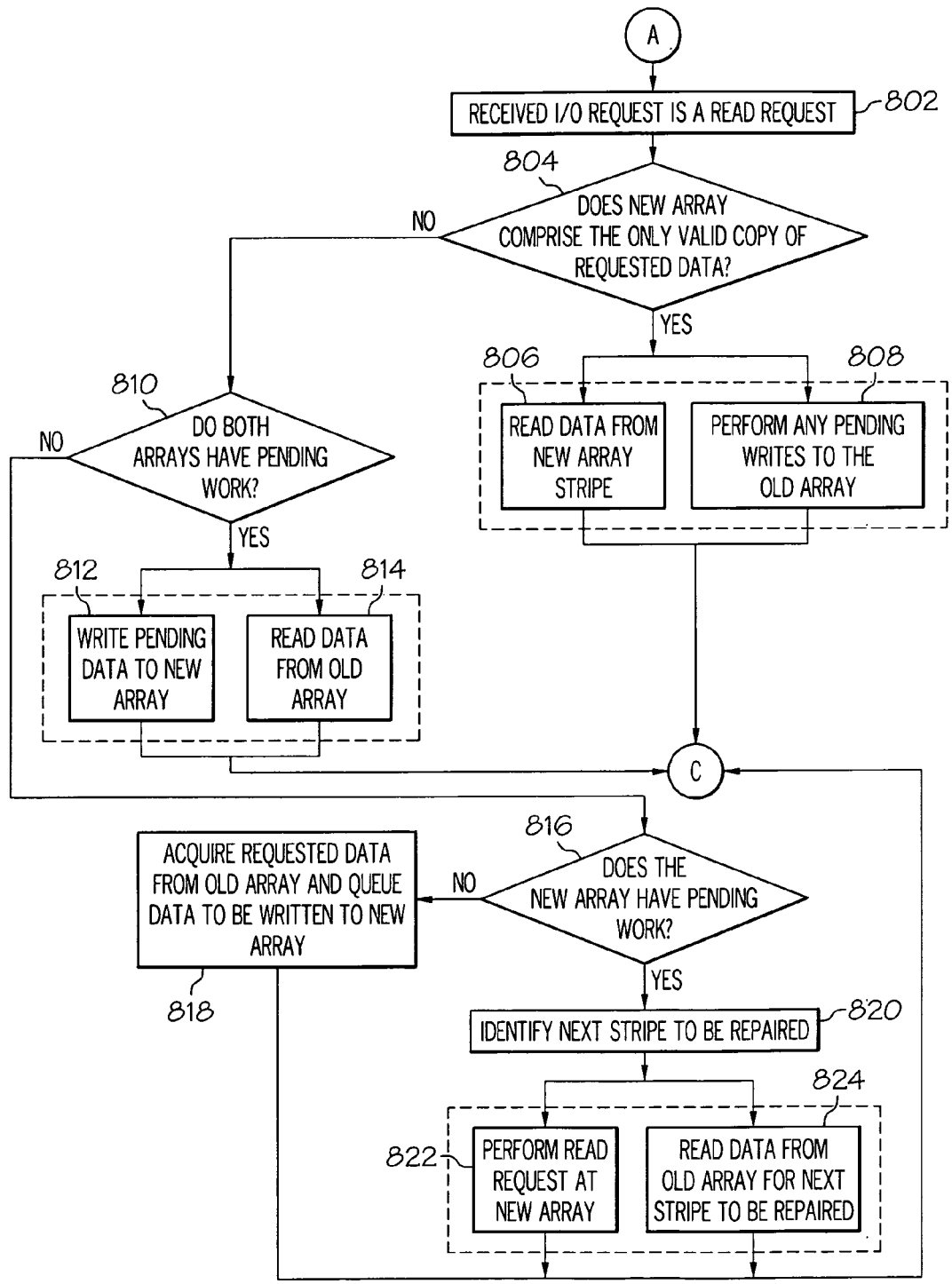

FIGS. 7-8 are operational flow diagrams illustrating a high performance process for rebuilding a failed disk in a disk array. The operational flow diagram of FIG. 7 begins at step 702 and flows directly to step 704. The rebuild manager 126, at step 704, detects a failed disk 408 in an array 346. The rebuild manager 126, at step 706, selects a number of hot spare disks 326 that is equivalent to the number of disks in the array 326 comprising the failed disk 408.

The rebuild manager 126, at step 708, determines if an I/O request has been received. If the result of this determination is negative, the rebuild manager 126, at step 710, identifies the next array stripe to be repaired. The rebuild manager 126, at step 712, determines if there is work to be done on the new array 328 (e.g., the new array queue has pending jobs). If the result of this determination is positive, the rebuild manager 126, at step 714, reads data from the old array 346 for the stripe to be repaired and simultaneously writes the data in the queue to the new array 328 at step 716. The control flow then returns back to step 708. If the result of the determination at step 712 is negative, the rebuild manager 126, at step 718, reads data from the old array 346.

If the result of the determination at step 708 is positive, the rebuild manager 126, at step 720, determines if the request is a write request. If the result of this determination is negative, the control flows to entry point A of FIG. 8. If the result of this determination is positive, the rebuild manager 126, at step 722, directs the write request to the new array stripe corresponding to the data. While this data is being written at the new array 328, the rebuild manager 126, at step 724, acquires data for the next stripe to be repaired from the old array 346. This acquired data is placed in the new array queue to be written to the new array 328 The rebuild manager 126, at step 726, removes any stale data from the new array queue as discussed above.

The rebuild manager 126, at step 728, determines if any data needs to be written to the old array 346. For example, data is written back to told array to avoid a situation where data items need to be read only from the new array 328 because it has the only valid copy. If the result of this determination is positive, the data, at step 730, is written to the old array 346. The control then flows to step 732. If the result of this determination is negative, the rebuild manager 126, at step 732, determines if any more stripes need to be repaired. If the result of this determination is positive, the control flow returns to step 708. If the result of this determination is negative, the rebuild manager 126, at step 734, returns the hot spare disks back to the spare pool. The control flow then exits at step 736.

FIG. 8 is a continuation of the operational flow diagram of FIG. 7. As discussed above, if the result of the determination at step 720 is negative, the control flows to entry point A of FIG. 8. The rebuild manager 126, at step 804, if the new array 328 has the only valid copy of the requested data. If the result of this determination is positive, the rebuild manager 126, at step 806, reads the request data from the stripe in the new array 328 while simultaneously performing any pending writes to the old array at step 808. The control then flows to entry point C of FIG. 7.

If the result of the determination at step 804 is negative, the rebuild manager 126, at step 810, determines if both arrays 326, 346 have pending work. If the result of this determination is positive, the rebuild manager 126, step 812, selects the array with higher priority, which in this example is the new array 328 and writes the pending data to the new array 328 while simultaneously performing a read at the old array 346 at step 814. The control then flows to entry point C of FIG. 7. If the result of this determination is negative, the rebuild manager 126, at step 816, determines if the new array has any pending work. If the result of this determination is negative, the rebuild manager, at step 818, acquires requested data from the old array 346 and queues data to be written to the new array 328. The control then flows to entry point C of FIG. 7.

If the result of the determination at step 816 is positive, the rebuild manager 126, at step 820, identifies the nest stripe to be repaired. The rebuild manager 126, at step 822, performs the read request at the new array 328 while simultaneously reading data from the old array 346 for the next stripe to be repaired at step 824. The control then flows to entry point B of FIG. 7.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for managing disk failures in a disk array, the computer implemented method comprising:
    determining, by a processor of an information processing system, that at least one disk has failed in a first disk array, wherein the first disk array only accesses data by reading an entire stripe that is distributed across multiple disks in the first disk array;
    selecting, by the processor, a number of spare disks that is equal to a number of disks making up the first disk array;
    creating, by the processor, a second disk array from the number of disks that has been selected;
    acquiring, by the processor, data from the first disk array by reading at least one entire stripe from the first disk array; and
    writing, by the processor, a corresponding stripe comprising the data from each respective stripe that has been acquired to the second disk array.

2. The computer implemented method of claim 1, further comprising:
    receiving a data read request for a requested data set;
    determining that the first disk array and the second disk array both store a respective valid copy of the requested data set;
    identifying that one of the first disk array and second disk array has a higher priority than the other;
    writing, in response to the determining that the first disk array and the second disk array both store a respective valid copy of the requested data set, a second data set to a respective stripe on the one of the first disk array and second disk array with the higher priority; and
    reading, in response to receiving the data read request and while writing the second set, the requested data set from one of the first disk array and the second disk array that does not have the higher priority.

3. The computer implemented method of claim 1, further comprising:
    determining that data from each stripe in the first disk array has been stored in the corresponding stripe in the second disk array; and
    returning all of the disks in the first disk array except for the one disk that has failed to a pool of spare disks.

4. The computer implemented method of claim 1, further comprising:
    determining that an I/O request to write a specified data set has been received;
    writing a new stripe comprising the specified data set to a corresponding stripe in the second disk array; and
    reading, during the writing the new stripe, a second stripe from the first disk array corresponding to another stripe to be repaired the second disk array.

5. The computer implemented method of claim 4, further comprising:
    storing data comprising the second stripe in a memory,
    wherein the writing the new stripe comprises writing the data comprising the second stripe that is contained in the memory to the second disk array, and wherein the writing the new stripe is performed in response to at least one of:
        determining that an idle cycle exists for the second disk array; and
        determining that data is being at least one of read from and written to the first disk array.

6. The computer implemented method of claim 5, further comprising:
    determining that the second stripe on the second disk array stores a newer version of data than the data comprising the second stripe that is stored the memory; and
    removing, in response to determining that the second stripe on the second disk array stores a newer version of data than the data comprising the second stripe that is stored the memory, the data stored in memory.

7. The computer implemented method of claim 1, wherein the first disk array and the second disk array are part of a General Parallel File System.

8. The computer implemented method of claim 1, further comprising:
    receiving a data read request for a requested data set;
    determining that the second disk array stores a valid and more recent version of the requested data set than is stored in the first disk array; and
    reading, in response to the determining that the second disk array stores a more valid and more recent version of the requested data set, the requested data set from a stripe at the second disk array comprising the requested data set.

9. The computer implemented method of claim 8, further comprising:
    determining that a pending write request exists in a queue to store a second data set; and
    writing, while reading the data that has been requested from the stripe at the second disk array, a second data to the first disk array.

10. An information processing system for managing disk failures in a disk array, the information processing system comprising:
   a memory;
   a processor communicatively coupled to the memory; and
   a disk array controller communicatively coupled to at least a first storage disk array and a set of spare storage disks, wherein the disk array controller comprises a disk rebuild manager configured to perform a method comprising:
      determining that at least one disk has failed in the first disk array, wherein the first disk array only accesses data by reading an entire stripe that is distributed across multiple disks in the first disk array;
      select a number of spare disks in the set of spare disks that is equal to a number of disks making up the first disk;
      create a second disk array from the number of disks that has been selected;
      acquire data from the first disk array by reading at least one entire stripe from the first disk array; and
      write a corresponding stripe comprising the data from each respective stripe that has been acquired to the second disk array.

11. The information processing system of claim 10, wherein the disk array controller is further adapted to:
   receive a data read request for a requested data set;
   determine that the second disk array stores a valid and more recent version of the requested data set than is stored in the first disk array;
   write, in response to the determining that the first disk array and the second disk array both store a respective valid copy of the requested data set, a second data set to a respective stripe on the one of the first disk array and second disk array with the higher priority; and
   read, in response to the determining that the second disk array stores a more valid and more recent version of the requested data set, the requested data set from a stripe at the second disk array comprising the requested data set.

12. The information processing system of claim 11, wherein the disk array controller is further adapted to:
   determine that a pending write request exists in a queue to store a second data set; and
   write, while reading the data that has been requested from the stripe at the second disk array, a second data to the first disk array.

13. The information processing system of claim 10, wherein the disk array controller is further adapted to:
   determine that data from each stripe in the first disk array has been stored in the corresponding stripe in the second disk array; and
   return all of the disks in the first disk array except for the one disk that has failed to a pool of spare disks.

14. The information processing system of claim 10, wherein the disk array controller is further adapted to:
   determine that an I/O request to write a specified data set has been received;
   write a new stripe comprising the specified data set to a corresponding stripe in the second disk array; and
   read, while the new stripe is being written, a second stripe from the first disk array corresponding to another stripe to be repaired the second disk array.

15. The information processing system of claim 14, wherein the disk array controller is further adapted to:
   store data comprising the second stripe in a memory,
   wherein the disk array controller is further adapted to write the new stripe by:
      writing the new stripe comprises writing the data comprising the second stripe that is contained in the memory to the second disk array, and wherein the writing the new stripe is performed in response to at least one of:
         determining that an idle cycle exists for the second disk array; and
         determining that data is being at least one of read from and written to the first disk array.

16. A computer program product for managing disk failures in a disk array, the computer program product comprising:
   a non-transitory storage medium readable by a processing circuit and storing instructions for execution by the processing circuit for performing a method comprising:
      determining that at least one disk has failed in a first disk array, wherein the first disk array only accesses data by reading an entire stripe that is distributed across multiple disks in the first disk array;
      selecting a number of spare disks that is equal to a number of disks making up the first disk;
      creating a second disk array from the number of disks that has been selected;
      acquiring data from the first disk array by reading at least one entire stripe from the first disk array; and
      writing a corresponding stripe comprising the data from each respective stripe that has been acquired to the second disk array.

17. The computer program storage product of claim 16, the method further comprising:
   receiving a data read request for a requested data set;
   determining that the second disk array stores a valid and more recent version of the requested data set than is stored in the first disk array; and
   reading, in response to the determining that the second disk array stores a more valid and more recent version of the requested data set, the requested data set from a stripe at the second disk array comprising the requested data set.

18. The non-transitory computer program storage product of claim 17, the method further comprising:
   determining that a pending write request exists in a queue to store a second data set; and
   writing, while reading the requested data set from the stripe at the second disk array, a second data to the first disk array.

19. The computer program storage product of claim 16, the method further comprising:
   determining that an I/O request to write a specified data set has been received;
   writing a new stripe comprising the specified data set to a corresponding stripe in the second disk array; and
   reading, during the writing the new stripe, a second stripe from the first disk array corresponding to another stripe to be repaired the second disk array.

20. The computer program storage product of claim 19, the method further comprising:
   storing data comprising the second stripe in a memory,
   wherein the writing the new stripe comprises writing the data comprising the second stripe that is contained in the memory to the second disk array, and wherein the writing the new stripe is performed in response to at least one of:
      determining that an idle cycle exists for the second disk array; and
      determining that data is being at least one of read from and written to the first disk array.

* * * * *